M. A. LEWIS.
KETTLE LID.
APPLICATION FILED MAR. 22, 1910.

987,077.

Patented Mar. 14, 1911.

Witnesses:
F. C. Valentine
C. J. Trentanell

Inventor:
Morton A. Lewis,
by Obed C. Billman
his attorney.

UNITED STATES PATENT OFFICE.

MORTON ABRAHAM LEWIS, OF TERRE HAUTE, INDIANA.

KETTLE-LID.

987,077.      Specification of Letters Patent.      Patented Mar. 14, 1911.

Application filed March 22, 1910. Serial No. 550,947.

*To all whom it may concern:*

Be it known that I, MORTON A. LEWIS, a citizen of the United States, residing at Terre Haute, in the county of Vigo and State of Indiana, have invented certain new and useful Improvements in Kettle-Lids, of which the following is a specification.

My invention relates to improvements in kettle-lids, such as tea kettles and the like, the primary object of the invention being to provide a generally improved kettle-lid of simple, cheap, and efficient construction, adapted to facilitate the filling of an ordinary tea kettle from the discharge pipe or faucet of an ordinary hydrant without removing the lid and at the same time protecting or shielding the hands from escaping steam.

With the above mentioned and other ends in view, the invention consists in the novel construction, arrangement, and combination of parts, hereinafter described, illustrated in one of its embodiments in the accompanying drawings, and particularly pointed out in the appended claims.

Figure 1:
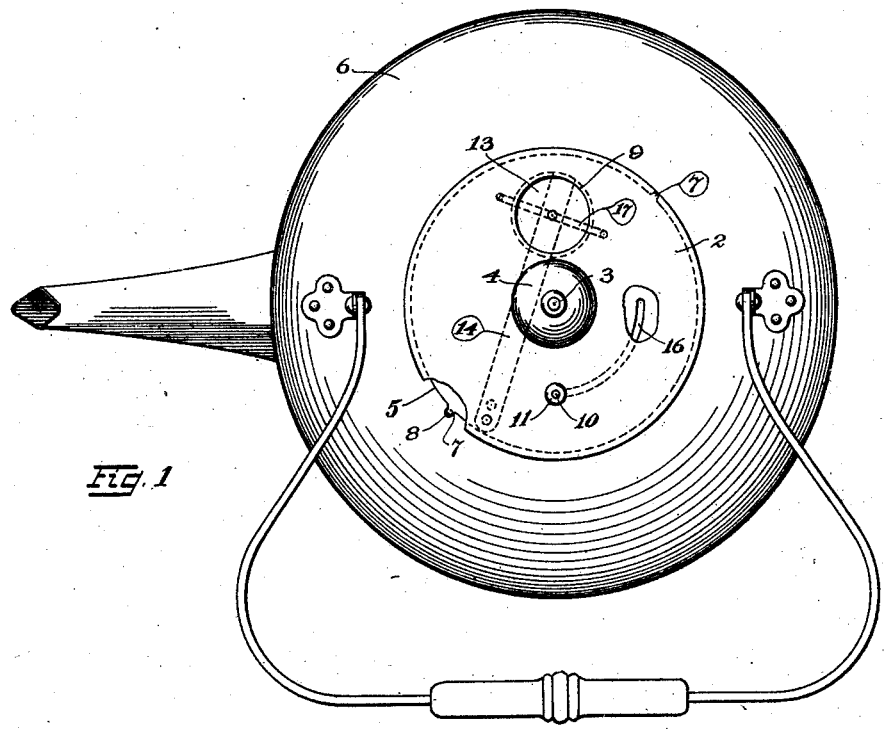
Figure 2:
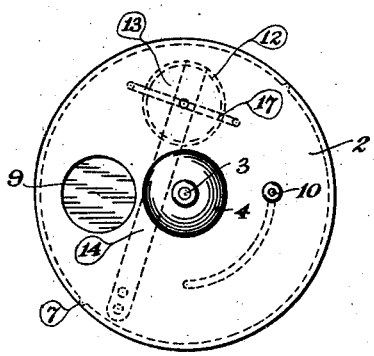
Figure 3:
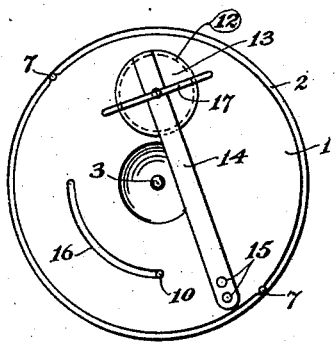
Figure 4:
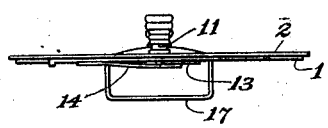

Referring to the accompanying drawings, forming a part of this specification, Figure 1, is a top plan view of the improved kettle-lid as applied to an ordinary tea kettle, the parts being shown in their open position. Fig. 2, a top plan view of the improved kettle-lid with the parts in closed position. Fig. 3, a plan view of the underside of the improved kettle lid, the parts being shown in open position. Fig. 4, a side elevation of the same.

Similar numerals of reference designate like parts throughout all the figures of the drawings.

The improved kettle-lid comprises a main or stationary lid member 1, and a superposed revoluble lid member 2, pivotally secured thereto by means of a pivot pin 3, and handle 4. The main or stationary lid member 1, is adapted to fit in the opening 5, of an ordinary tea kettle 6, as shown in Fig. 1, of the drawings, and as a means for preventing circumferential movement of the lid member 1, the latter may be provided with stop lugs 7, adapted to register with and take into similarly shaped recesses 8, about the periphery of the opening 5, as shown. The revoluble lid member 2, is provided with an inlet opening 9, and a stop or handle pin 10, and handle 11, by means of which the revoluble lid member may be revolved upon the pivot pin 3, relative to the stationary lid member 1, for the purposes hereinafter mentioned.

The stationary or main lid member 1, is provided, in the present instance, with a valve opening 12, normally closed by a valve body 13, carried, in the present instance, immediately beneath the valve opening 12, by means of a spring arm or member 14, secured beneath the lid member 1, by means of rivets 15.

As a means for limiting the movements of the revoluble lid member 2, and stopping the same in its open and closed positions when the inlet opening 9, is brought into and out of registry with the valve opening 12, by means of the handle 11, the stop or handle pin 10, may be extended downwardly into a guide or limit slot 16, formed in the lid member 1, as shown.

When the inlet opening 9, of the lid member 2, has been brought into registry with the valve opening 12, as shown most clearly in Fig. 1, of the drawings, the kettle 6, may be elevated whereby the downwardly extending or projecting portion of the inlet pipe or faucet will take into the inlet opening 9, and engage and depress the valve body 13, thereby opening the valve, after which the water may be turned into the kettle in the ordinary manner. As a means for limiting the downward movement or depression of the valve body 13, a check or stop loop 17, may be provided as shown.

Having thus described an embodiment of my invention, what I claim and desire to secure by Letters Patent is,—

1. A kettle-lid, comprising a stationary lid member and a revoluble lid member, one of said members being provided with an inlet opening and the other with a valve adapted to open and close said inlet opening.

2. A kettle-lid, comprising a stationary lid member provided with a valve, a superposed revoluble lid member connected thereto and provided with an inlet opening adapted to be brought into and out of registry with said valve when said revoluble lid member is moved to its open and closed positions, and means for limiting the movements of said revoluble lid member.

3. A kettle-lid, comprising a revoluble lid member provided with an inlet opening, a stationary subjacent lid member connected to said revoluble lid member and provided with a valve opening adapted to register with said inlet opening when said revoluble lid member is moving to its open position, a valve normally closing said valve opening, and means for stopping said superposed lid member in its open and closed positions.

In testimony whereof I have affixed my signature, in presence of two witnesses.

MORTON ABRAHAM LEWIS.

Witnesses:
  JULIA JOHNSON,
  JOHNSON JOHNSON.

---

Copies of this patent may be obtained for five cents each, by addressing the "Commissioner of Patents, Washington, D. C."